United States Patent [19]

Woodwell et al.

[11] Patent Number: 4,832,574
[45] Date of Patent: May 23, 1989

[54] TURBINE DISK SECURING AND REMOVAL APPARATUS

[75] Inventors: Thornton G. Woodwell, Tequesta; Chandos E. Langston, Jr., Jupiter, both of Fla.

[73] Assignee: United Technologies Corporation, Hartford, Conn.

[21] Appl. No.: 155,186

[22] Filed: Feb. 12, 1988

[51] Int. Cl.⁴ ............................................. F01D 5/30
[52] U.S. Cl. ................................ 416/244 A; 403/16; 403/259
[58] Field of Search ............... 416/244 A; 403/16, 19, 403/259

[56] References Cited

U.S. PATENT DOCUMENTS

| | | | |
|---|---|---|---|
| 1,886,414 | 11/1932 | Meyer | 416/244 A |
| 2,652,271 | 9/1953 | Gaubatz | 416/244 A |
| 2,660,399 | 11/1953 | Robinson et al. | 416/244 A |
| 2,818,228 | 12/1957 | Petrie | 416/244 A |
| 3,060,559 | 10/1962 | Levenson | 29/256 |
| 3,680,979 | 8/1972 | Hansen et al. | 416/244 A |
| 3,749,516 | 7/1973 | Samurin et al. | 416/244 A |
| 3,997,962 | 12/1976 | Kleitz et al. | 29/427 |
| 4,642,866 | 2/1987 | Murtaugh | 29/259 |
| 4,767,230 | 8/1988 | Leas, Jr. | 403/19 |

FOREIGN PATENT DOCUMENTS 662090 11/1951 United Kingdom ........... 416/244 A

Primary Examiner—Robert E. Garrett
Assistant Examiner—John T. Kwon
Attorney, Agent, or Firm—Edward L. Kochey, Jr.

[57] ABSTRACT

A turbine disk assembly 20 has an extension including arms 34 and a groove 38. Nut 40 engages the groove and bears against the extension. A square head 48 on the nut fits a standard torque multiplying wrench and arms 34 provide a reaction so that no adapter tool is required. Groove 38 permits pulling the disk assembly by use of the nut, and also allows sleeve 50 to hold the nut from loosening.

2 Claims, 2 Drawing Sheets

TURBINE DISK SECURING AND REMOVAL APPARATUS

The Government has rights in this invention pursuant to a contract awarded by the Department of the Army.

DESCRIPTION

1. Technical Field

The invention relates to gas turbine engines and in particular to the assembly and disassembly thereof.

2. Background

The gas turbine engines the rotor disk assembly must be securely torqued to the shaft. During maintenance operations the disk must be removed. Removal of the locking nut can require three times the locking torque to loosen the nut.

Such maintenance operations must sometimes be carried out at remote locations in a limited time with limited manpower and limited tools. The evaluation of a design will therefore access a penalty for any additional tools required.

Removal torque normally exceeds that which can be applied by the average maintenance worker using conventional tools. Therefore, a mechanical torque wrench also known as a torque multiplying tool, is used. Such a torque wrench has a square receptacle for applying torque and two one-half inch diameter pins for reacting the torque. Special tools required to adapt the torque wrench to the apparatus may not be readily available.

SUMMARY OF THE INVENTION

A turbine disk assembly is splined and tightly fit to a shaft which has a threaded end. An extension of the disk assembly has an annular shoulder adjacent to the threaded end of the shaft, and the shoulder has an axially facing surface. Two opposed radially extending arms are secured to the shoulder and 90 degrees from this there are two opposed inwardly extending lips on the shoulder. These lips overlap a portion of the axially facing surface forming a groove under the lips.

A nut is threaded to the shaft with the nut having an outwardly extending flange which fits within the grooves and a nut faces in contact with the axially facing surface of the disk assembly. Accordingly, the nut reacting either against the lip or the shoulder may apply force to the disk assembly in either axial direction with respect to the shaft. The nut has a square head which will directly fit within a conventional torquing tool. The conventional torquing tool may not only direclty engage this square head but the extensions on the tool engage the arms located on the shoulder so that the nut may be torqued and untorqued using the conventional tool without auxiliary equipment.

A tubular locking sleeve has a square flange portion with fits within the groove. This flange locks the sleeve from rotation and the sleeve is deformable into slots within the nut, thereby operating to lock the nut as desired.

DESCRIPTION OF THE PREFERRED EMBODIMENT

Figure 1:
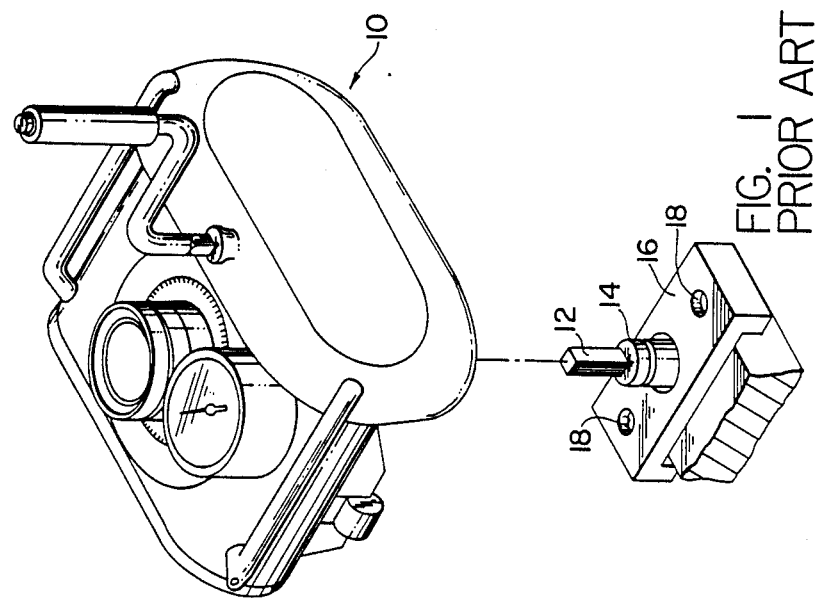
FIG. 1 shows the power wrench with the prior art adapters.
Figure 3:
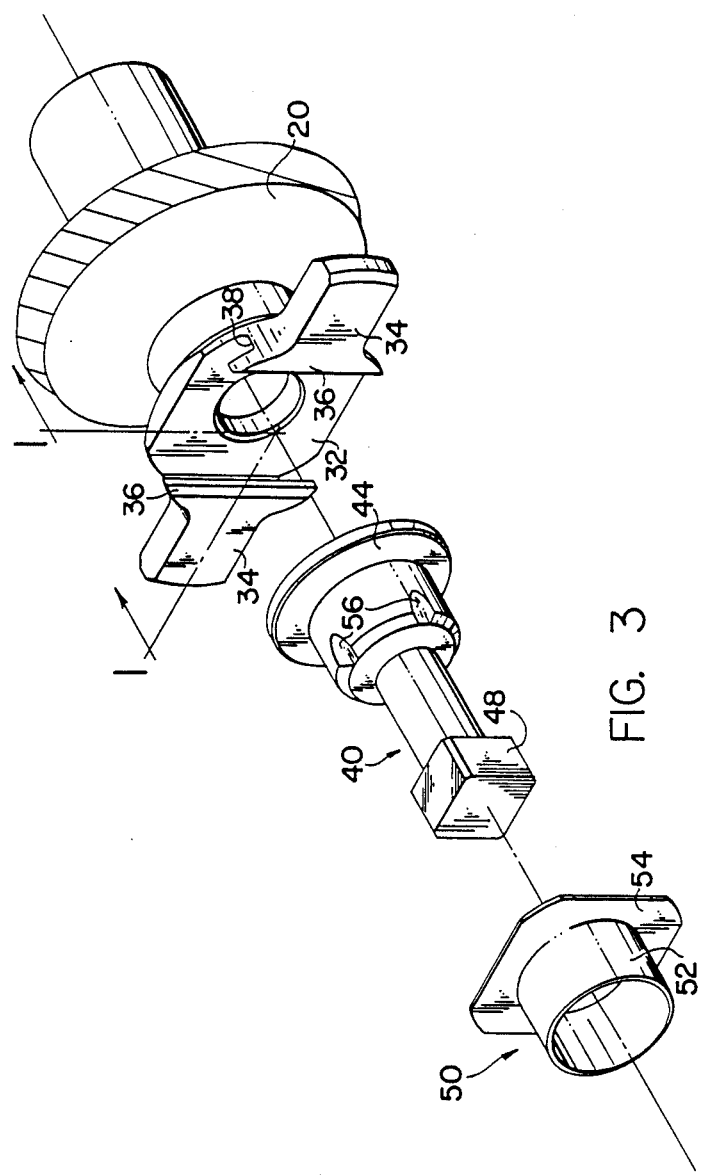
FIG. 3 is an exploded perspective of the locking and removal apparatus.

A conventional power amplifying torque wrench 10 is shown in FIG. 1 with a square adapter bar 12. This bar includes socket 14 with engages the nut to be removed and the bar fits within a torquing socket located within the power wrench. An adapter plate 16 is attached to the work piece and includes two reaction holes 18 which engage to one-half inch reaction pins of the torque wrench.

Figure 2:
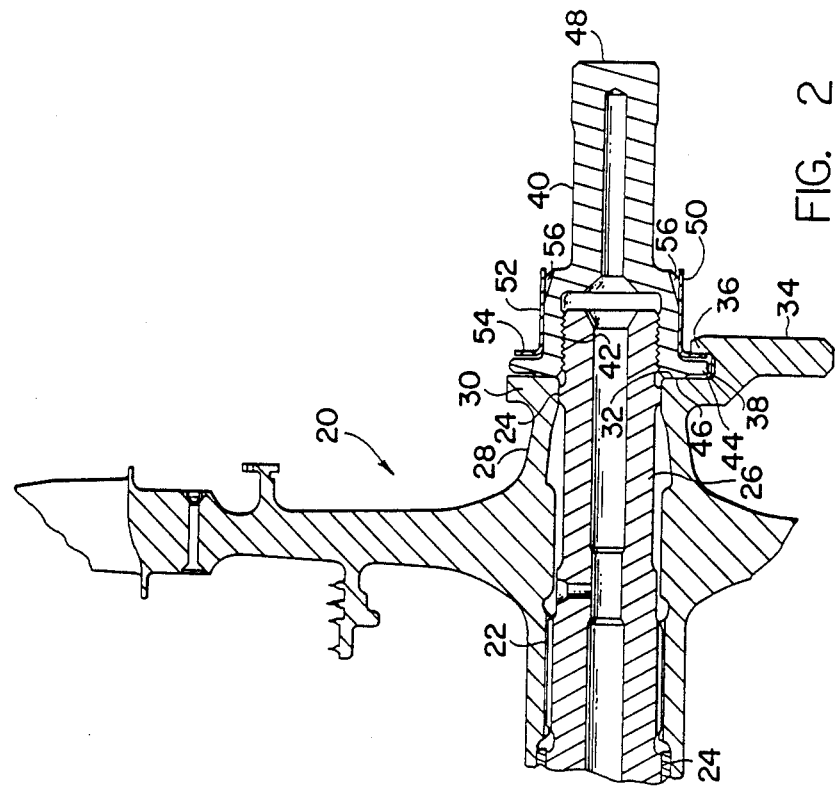
FIG. 2 is a sectional side elevation of a turbine disk assembly and locking nut.

Referring to FIG. 2, a turbine disk assembly 20 has splines 22 and an interference fit location 24 which provides for a tight fit to shaft 26. An extension 28 of the disk has an annular shoulder 30 including an axially extending face 32.

Also located on the shoulder are two opposed radially extending arms 34 and two opposed inwardly extending lips 36 which form a groove 38 between the lip 36 and the face 32. A nut 40 is secured to threads 42 of the shaft. The nut has an outwardly extending flange 44 fitting within the groove 38. A nut face 46 is in contact with the axially facing surface 32 of the turbine disk assembly. It can be seen that rotation of the nut may react against the turbine disk assembly to tighten the apparatus and may operate against lip 36 to remove the apparatus.

The nut has a square head 48 which will fit directly into the torquing tool. The pins of the torquing tool react against arms 34 thereby permitting both installation and removal of the disk assembly without special tools.

A locking sleeve 50 has a tubular portion 52 and a radially extending square flange 54. The inside edges of groove 38 are straight with the flange 54 of the locking sleeve fitting within these grooves. The locking sleeve thereby is precluded from rotating. A plurality of axially extending locking slots 56 are located on the nut in a position adjacent to the locking sleeve. The locking sleeve is deformed into these slots thereby providing means for locking the nut from rotation during turbine operation.

We claim:

1. A turbine disk securing and removal apparatus comprising:
   a shaft having a threaded end;
   a turbine disk assembly splined and tightly fit to said shaft;
   an extension of said disk assembly having an annular shoulder adjacent to the threaded end of said shaft, with an axially facing surface;
   two opposed radially extending arms secured to said shoulder;
   two opposed inwardly extending lips on said shoulder overlapping a portion of said axially facing surface forming a groove between said lips and said axially facing surface;
   a nut threadedly secured to said shaft having an outwardly extending flange fitting within said groove and having a nut face in contact with said axially facing surface of said disk assembly, whereby said nut may react against said turbine disk, assembly in either axial direciton; and
   a square head on said nut, whereby a conventional torquing tool may directly engage said head and said arms to torque said nut with respect to said turbine disk assembly without the need for auxiliary tools.

2. A turbine disk securing and removal apparatus as in claim 1:
   a locking sleeve having a tubular portion and a radially extending square flange, said flange nonrotatably engaged within said groove; and
   said nut having at least one axially extending locking slot adjacent to said tubular portion of said sleeve, whereby said sleeve may be deformed into said slot for locking said nut from rotation.

* * * * *